US011086398B2

(12) United States Patent
Gonzalez Franco et al.

(10) Patent No.: US 11,086,398 B2
(45) Date of Patent: Aug. 10, 2021

(54) HAPTIC RENDERING

(71) Applicant: Microsoft Technology Licensing, LLC, Redmond, WA (US)

(72) Inventors: Mar Gonzalez Franco, Seattle, WA (US); Eyal Ofek, Redmond, WA (US); Michael Jack Sinclair, Kirkland, WA (US); Anthony James Steed, Hertfordshire (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/434,792

(22) Filed: Jun. 7, 2019

(65) Prior Publication Data

US 2020/0387223 A1 Dec. 10, 2020

(51) Int. Cl.
| | |
|---|---|
| *G06F 3/041* | (2006.01) |
| *G06F 3/01* | (2006.01) |
| *G06F 3/038* | (2013.01) |
| *G06T 15/00* | (2011.01) |

(52) U.S. Cl.
CPC .............. *G06F 3/016* (2013.01); *G06F 3/011* (2013.01); *G06F 3/038* (2013.01); *G06T 15/00* (2013.01)

(58) Field of Classification Search
USPC ..................................... 345/8, 156, 173, 174
See application file for complete search history.

(56) References Cited

U.S. PATENT DOCUMENTS

| | | | | |
|---|---|---|---|---|
| 10,860,101 | B1* | 12/2020 | Menguc | ............... H01L 41/193 |
| 2017/0131775 | A1 | 5/2017 | Clements | |
| 2018/0314416 | A1* | 11/2018 | Powderly | ........... G02B 27/0172 345/173 |
| 2019/0043321 | A1* | 2/2019 | Aghara | ................... G06F 3/016 345/156 |
| 2019/0059155 | A1* | 2/2019 | Harple | ................. H05K 1/0393 |
| 2019/0201785 | A1* | 7/2019 | Heubel | ................. A63F 13/285 345/8 |
| 2019/0261510 | A1* | 8/2019 | Harple | ................. H05K 1/0284 |
| 2019/0272036 | A1* | 9/2019 | Grant | ..................... G06F 3/012 345/8 |
| 2019/0355225 | A1* | 11/2019 | Khoshkava | ............. G06F 3/016 345/174 |
| 2020/0057500 | A1* | 2/2020 | Cruz-Hernandez | ..... G06F 3/016 345/8 |
| 2020/0110465 | A1* | 4/2020 | Ma | ........................ B25J 13/025 345/174 |

(Continued)

OTHER PUBLICATIONS

Raun, C., et al., "Adaptive Mould—A Cost-Effective Mould System Linking Design and Manufacturing of Double-Curved GFRC Panels", In Proceedings of 17th International Congress of GRCA-GRC, Apr. 19, 2015, 7 Pages.

(Continued)

*Primary Examiner* — Thuy N Pardo
(74) *Attorney, Agent, or Firm* — Alleman Hall Creasman & Tuttle LLP

(57) ABSTRACT

Examples are disclosed that relate to haptic rendering. One disclosed example provides a haptic rendering device including a patterned layer that exhibits auxetic behavior, and a plurality of actuators configured to move the patterned layer, each actuator being individually controllable to cooperatively change a curvature of the patterned layer in two dimensions.

19 Claims, 14 Drawing Sheets

(56) References Cited

U.S. PATENT DOCUMENTS

| | | | | |
|---|---|---|---|---|
| 2020/0142485 A1* | 5/2020 | Ma | H05K 1/038 |
| | | | 345/8 |
| 2020/0177103 A1* | 6/2020 | Lindsay | H01L 41/183 |
| 2020/0185592 A1* | 6/2020 | Spann | H01L 41/083 |
| | | | 345/173 |
| 2020/0375506 A1* | 12/2020 | Bishop | G16H 50/30 |
| 2021/0015189 A1* | 1/2021 | Nordstrom | B32B 37/144 |

OTHER PUBLICATIONS

"Super Flexible Laser Cut Plywood", Retrieved From: https://www.youtube.com/watch?v=7GHLXUv8cTI, Aug. 31, 2015, 3 Pages.
"Virtuose 6d", Retrieved From: https://www.haption.com/fr/products-fr/virtuose-6d-fr.html, Retreived On: May 28, 2019, 4 Pages.
Alderson, et al., "Auxetic Materials", In Proceedings of the Institution of Mechanical Engineers, Part G: Journal of Aerospace Engineering vol. 221, Issue 4, Apr. 1, 2007, pp. 565-575.
Alexander, et al., "Grand Challenges in Shape-Changing Interface Research", In Proceedings of the CHI Conference on Human Factors in Computing Systems, Paper No. 299, Apr. 21, 2018, pp. 1-14.
Araujo, et al., "Snake Charmer: Physically Enabling Virtual Objects", In Proceedings of the Tenth International Conference on Tangible, Embedded, and Embodied Interaction, Feb. 14, 2016, pp. 218-226.
Benko, et al., "NormalTouch and TextureTouch: High-fidelity 3D Haptic Shape Rendering on Handheld Virtual Reality Controllers", In Proceedings of the 29th Annual Symposium on User Interface Software and Technology, Oct. 16, 2016, 12 Pages.
Bos, et al., "A Structured Overview of Trends and Technologies Used in Dynamic Hand Orthoses", Published in Journal of NeuroEngineering and Rehabilitation, vol. 13, Jun. 29, 2016, pp. 1-25.
Coelho, et al., "Shape-changing Interfaces", In Proceedings of Personal and Ubiquitous Computing vol. 15, Issue 2, Feb. 2011, 161-173.
Covarrubias, et al., "Immersive VR for Natural Interaction with a Haptic Interface for Shape Rendering", In Proceedings of 1st International Forum on Research and Technologies for Society and Industry Leveraging a Better Tomorrow (RTSI), Sep. 16, 2015, pp. 82-89.
Covarrubias, et al., "Kinematic and Workspace Analysis of a 2-DOF Haptic End-Effector That Carries Out a Developable Haptic Strip", In Proceedings of International Mechanical Engineering Congress and Exposition, vol. 7, American Society of Mechanical Engineers, Nov. 11, 2011, pp. 223-232.
Dibbern, et al., "AcuTable: A Touch-Enabled, Actuated Tangible User Interface", In Interactivity, Game Creation, Design, Learning, and Innovation, May 2, 2016, 7 Pages.
Donato, et al., "Approximate Thin Plate Spline Mappings", In Proceedings of the 7th European Conference on Computer Vision—Part III, May 28, 2002, pp. 21-31.
Elonen, Jarno, "Thin Plate Spline editor—an Example Program in C++", Retrieved From: https://elonen.iki.fi/code/tpsdemo/, Jan. 2005, 5 Pages.
Evans, et al., "Auxetic Materials: Functional Materials and Structures from Lateral Thinking!", In Advanced Materials vol. 12, Issue 9, May 1, 2000, 617-628.
Evans, Ken E.., "Auxetic Polymers: a New Range of Materials", In Journal of Endeavour vol. 15, Issue 4, Jan. 1991, 170-174.
Everitt et al., "PolySurface: A Design Approach for Rapid Prototyping of Shape-Changing Displays Using Semi-Solid Surfaces", In Proceedings of the Conference on Designing Interactive Systems, Jun. 10, 2017, 12 Pages.
Fitzgerald, et al., "Mediate: A Spatial Tangible Interface for Mixed Reality", In Proceedings of Extended Abstracts of the CHI Conference on Human Factors in Computing Systems, Apr. 21, 2018, pp. 1-6.
Follmer, et al., "inFORM: Dynamic Physical Affordances and Constraints Through Shape and Object Actuation", In Proceedings of the 26th Annual ACM Symposium on User Interface Software and Technology, Oct. 8, 2013, pp. 417-426.
Frisoli, et al., "A Fingertip Haptic Display for Improving Curvature Discrimination", Published in Teleoperators and Virtual Environments vol. 17, Issue 6, Dec. 1, 2008, 550-561.
Furukawa, et al., "Encountered-type Visual Haptic Display Using Flexible Sheet", In Proceedings of IEEE International Conference on Robotics and Automation, Apr. 10, 2007, pp. 479-484.
Gordon, "The Haptic Perception of Curvature", In Perception & Psychophysics, vol. 31, Issue 5, Sep. 1, 1982, pp. 446-450.
Gu, et al., "Dexmo: An Inexpensive and Lightweight Mechanical Exoskeleton for Motion Capture and Force Feedback in VR", In Proceedings of the CHI Conference on Human Factors in Computing Systems, May 7, 2016, 5 Pages.
Guseinov, et al., "CurveUps: Shaping Objects from Flat Plates with Tension-actuated Curvature", In Journal ACM Transactions on Graphics, vol. 36 Issue 4, Article No. 64, Jul. 2017, 12 Pages.
Hirota, et al., "Simulation and Presentation of Curved Surface in Virtual Reality Environment Through Surface Display", In Proceedings of the Virtual Reality Annual International Symposium, Mar. 11, 1995, pp. 211-216.
Horst, et al., "Curvature Discrimination in Various Finger Conditions", Published in Experimental Brain Research, vol. 177, Issue 3, Mar. 2007, pp. 304-311.
Huang, et al., "A reconfigurable Interactive Interface for Controlling Robotic Origami in Virtual Environments", In International Journal of Robotics Research, vol. 37, Issue 6, May 2, 2018, pp. 1-19.
Iwata, et al., "Project FEELEX: Adding Haptic Surface to Graphics", In Proceedings of the Annual Conference on Computer Graphics and Interactive Techniques, Aug. 1, 2001, 7 Pages.
Jeon, Seokhee, "Haptic Rendering of Curved Surface by Bending an Encountered-Type Flexible Plate", In Proceedings of IEICE Transactions on Information and Systems vol. E99-D, Issue 7, Jul. 1, 2016, pp. 1862-1870.
Kappers, Astrid M. L., "Human Perception of Shape from Touch", In Proceedings of Philosophical Transactions of the Royal Society B, Biological Sciences, vol. 366, Nov. 2011, pp. 3106-3114.
Kim, et al., "Encountered-type Haptic Display for Large VR Environment Using Per-plane Reachability Maps", In Proceedings of Computer Animation and Virtual Worlds, vol. 29, Mar. 21, 2018, pp. 1-11.
Klare, et al., "The Formable Object: A 24-Degree-of-Freedom Shape-Rendering Interface", In Proceedings of IEEE/ASME Transactions on Mechatronics, vol. 20, Issue 3, Jun. 2015, pp. 1360-1371.
Kolpakov, A. G.., "Determination of the Average Characteristics of Elastic Frameworks", In Journal of Applied Mathematics and Mechanics, vol. 49, Issue 6, Jan. 1985, pp. 739-745.
Konakovi, et al., "Beyond Developable: Computational Design and Fabrication with Auxetic Materials", In Journal of ACM Transactions on Graphics, vol. 35, Issue 4, Article No. 89, Jul. 11, 2016, 11 Pages.
Konakovic-Lukovic, et al., "Rapid Deployment of Curved Surfaces Via Programmable Auxetics", In Journal of ACM Transactions on Graphics, vol. 37, Issue 4, Article No. 106, Aug. 2018, 13 Pages.
Lindlbauer, et al., "Combining Shape-Changing Interfaces and Spatial Augmented Reality Enables Extended Object Appearance", In Proceedings of the CHI Conference on Human Factors in Computing Systems, May 7, 2016, pp. 791-802.
Mansutti, et al., "Visuo-tactile System for 3d Digital Models Rendering", In Proceedings OF Computer-Aided Design and Applications vol. 13, Issue 2, Mar. 2016, pp. 236-245.
Mazzone, et al., "Sketching the Future of the SmartMesh Wide Area Haptic Feedback Device by Introducing the Controlling Concept for such a Deformable Multi-loop Mechanism", In Proceedings of First Joint Eurohaptics Conference and Symposium on Haptic Interfaces for Virtual Environment and Teleoperator Systems, World Haptics Conference, Mar. 18, 2005, 8 Pages.
McNeely, W A.., "Robotic Graphics: A New Approach to Force Feedback for Virtual Reality", In Proceedings of the IEEE Virtual Reality Annual International Symposium, Sep. 18, 1993, pp. 336-341.
Siu, et al., "shapeShift: 2d Spatial Manipulation and Self-Actuation of Tabletop Shape Displays for Tangible and Haptic Interaction", In

(56) References Cited

OTHER PUBLICATIONS

Proceedings of the CHI Conference on Human Factors in Computing Systems, Apr. 21, 2018, 13 Pages.
Solazzi, et al., "Design of a Novel Finger Haptic Interface for Contact and Orientation Display", In Proceedings of IEEE Haptics Symposium, Mar. 25, 2010, pp. 129-132.
Stavroulakis, G. E.., "Auxetic Behaviour: Appearance and Engineering Applications", Published in Physica Status Solidi (B), Applied Research, vol. 242, Issue 3, Feb. 11, 2005, pp. 710-720.
Sturdee, et al., "Analysis and Classification of Shape-Changing Interfaces for Design and Application-based Research", In Journal of ACM Computing Surveys (CSUR), vol. 51, Issue 1, Article No. 2, Jan. 2018, 32 Pages.
Summers, et al., "Results from a Tactile Array on the Fingertip", In Proceedings of Eurohaptics, vol. 2001, Jul. 1, 2001, 3 Pages.
Wijntjes, et al., "Local Surface Orientation Dominates Haptic Curvature Discrimination", Published in IEEE Transactions on Haptics vol. 2, Issue 2, Apr. 2009, 9 Pages.
Yang, et al., "Review on Auxetic Materials", In Journal of Materials Science vol. 39, Issue 10, May 2004, pp. 3269-3279.
Yano, et al., "Development of a High-resolution Surface Type Haptic interface for Rigidity Distribution Rendering", In Proceedings of 14th Symposium on Haptic Interfaces for Virtual Environment and Teleoperator Systems, Mar. 25, 2006, pp. 355-360.
Zarrinmehr, et al., "Interlocked Archimedean Spirals for Conversion of Planar Rigid Panels into Locally Flexible Panels with Stiffness Control", Published in Computers & Graphics, vol. 66, Aug. 2017, pp. 93-102.
Zeng, et al., "Haptic Perception of Curvature Through Active Touch", In Proceedings of IEEE World Haptics Conference, Jun. 21, 2011, pp. 533-538.
Kyung, et al., "TAXEL: Initial Progress Toward Self-Morphing Visio-Haptic Interface", In Proceedings of the IEEE Conference on World Haptics, Jun. 21, 2011, pp. 37-42.
"International Search Report and Written Opinion Issued in PCT Application No. PCT/US20/030335", dated Jul. 23, 2020, 11 Pages.

\* cited by examiner

HAPTIC RENDERING

BACKGROUND

Virtual reality (VR) display systems immerse a user in virtual imagery occupying an entire field of view. Such display systems may represent visual and auditory aspects of a virtual experience in a lifelike manner.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to haptic rendering. One disclosed example provides a haptic rendering device comprising a patterned layer that exhibits auxetic behavior, and a plurality of actuators configured to move the patterned layer, each actuator being individually controllable to cooperatively change a curvature of the patterned layer in two dimensions.

DETAILED DESCRIPTION

Figure 1:
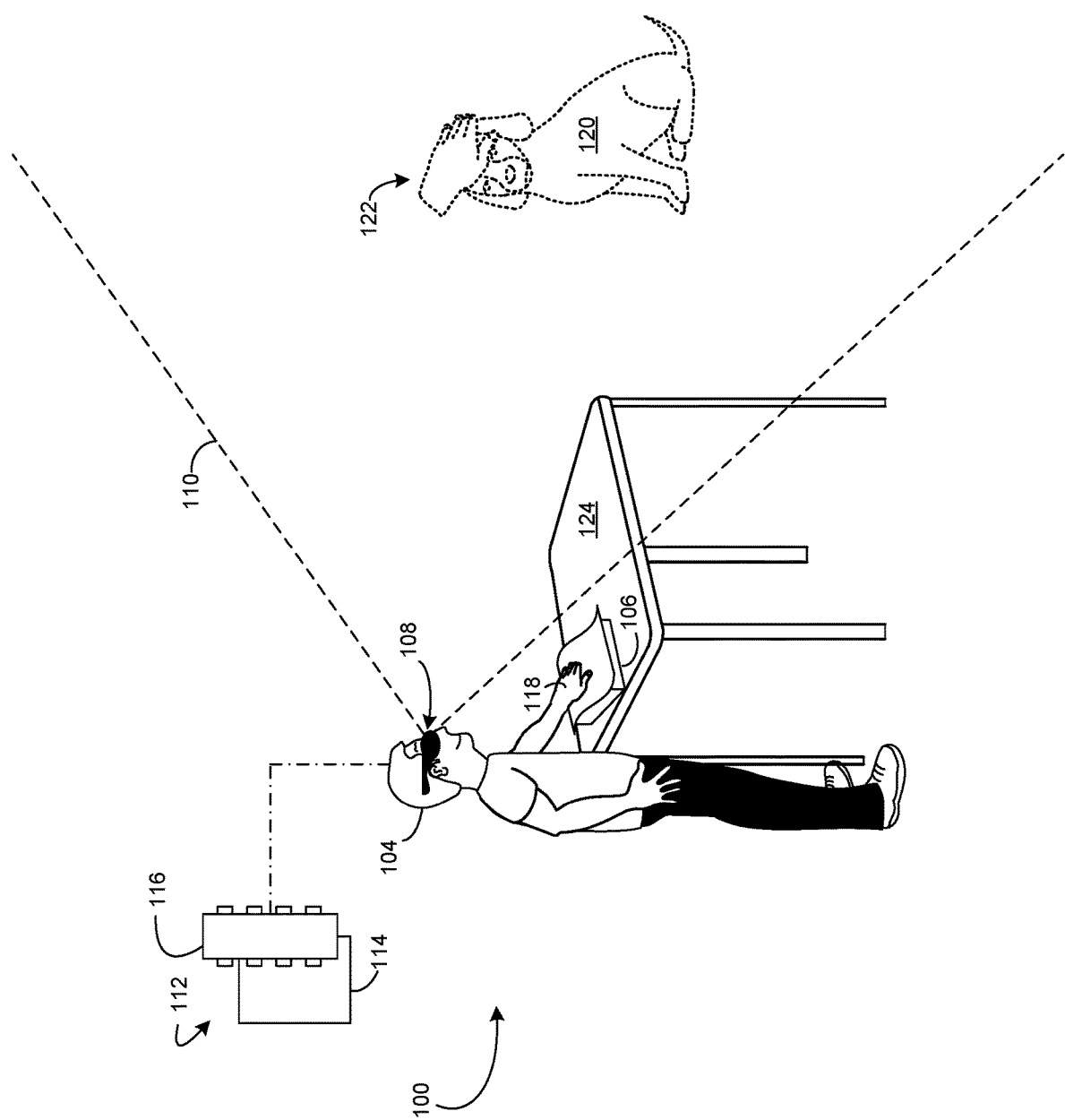
FIG. 1 shows aspects of an example display system in which a haptic rendering device simulates a tactile interaction with a displayed virtual object.

While VR display systems may present visual and aural stimuli at high fidelity, it may be difficult to provide haptic feedback that realistically represents physical interactions with virtual imagery.

Some display systems may be configured to present force feedback via a grounded robot with which a user interacts. As one example, a display system may include a handle-shaped robot configured to be gripped by a user, wherein the robot is controlled by a linkage that moves the robot in six degrees of freedom. As another example, a display system may include a hand-mounted robot, such as a glove device, configured to selectively restrict finger motion and/or actuate a finger to present surface normal or textured tactile sensations. However, such mechanisms provide haptic feedback to a user only when the user performs a specific posture (e.g. a grip on a handle) or wears another device.

In a VR experience, a user's vision of a surrounding real-world environment is obscured by an opaque display. Thus, a user may not perceive a haptic device during use. In view of this, rather than concealing haptic feedback mechanisms within a surface of a wearable device or a grounded robot, a VR display system may utilize a more complex and/or larger device to present haptic experiences. This has led to the development of encounter-style haptics, where a user may reach out to touch an object or surface that moves or changes shape.

Shape-changing devices are robotic systems that attempt to create shapes and surface for humans to encounter, touch, and manipulate, and thus may be used to provide encounter-style haptic experiences in VR experiences. Shape-changing devices may also be used for human-computer interaction in AR (augmented reality) applications (including MR (mixed reality)), as well as a variety of other haptic feedback applications. To express general forms, a shape-changing device may have a reasonably high number of degrees of freedom and a mechanical structure that converts an actuation to some form of constrained surface. Such shape-changing devices may be configured to support full-hand interaction, or configured in other form factors (e.g. for surface interactions on a thumb or finger).

One type of shape-changing device takes the form of an articulated surface in which two-dimensional elements are connected via hinges that, when actuated, cause the articulated surface to fold into a different shape. Another type of shape-changing device includes a stretchable surface and in-surface actuators that, when actuated, cause the surface to deform by stretching. Another type of shape-changing device utilizes a pin array in which pins are actuated to form an approximation of a three-dimensional surface. Each of these shape-changing devices represents shape through a discrete set of elements. To achieve a suitably high resolution, such devices may include a dense arrangement of the discrete elements (hinges, in-surface actuators, pins). However, each discrete element may be controlled by a separate motor, which increases cost, complexity, and maintenance of the system as size increases. While such devices may adequately convey gross shape, a user may experience surface discontinuities when touching such a device. For example, a user may feel a relief between pins of a pin array, a hinging between elements of an articulated surface, or a spacing between in-surface actuators.

Further, in instances in which a shape-changing device represents a shape of a virtual display object larger than the shape-changing device (e.g. an elephant, an automobile, etc.), a user touching the shape-changing device is haptically blind to any portion of the virtual display object that is not being touched. The user may experience other portions of the virtual display object by moving a hand along the shape-changing device. However, discrete elements such as pins moving up/down may generate poor cues for a hand sliding along a shape-changing device, as a user will feel stepped transitions between edges of pins.

To create an impression of a smoother surface, such shape-changing devices may include an elastic membrane stretched over the discrete elements (pins, hinges, actuators, etc.), as mentioned above. However, the elastic membrane does not change the frequency of the discrete elements that a user may perceive through tactile exploration. Further, an elastic membrane may be unable to accurately interpolate a shape. Instead, an elastic membrane may change direction rapidly at each discrete element and extend linearly to the next discrete element. Further, the elasticity may cause a user's finger to deform the membrane when the user touches the membrane at a location between pins (or other discrete elements), which may obscure a shape expressed by the shape-changing device.

Additionally, various other shape-changing devices may manipulate a developable surface, which is unable to interpolate a wide variety of surface types.

Accordingly, examples disclosed herein relate to a haptic rendering device that may address the above-described issues with shape-changing devices. Briefly, the disclosed examples utilize a shape-shifting layer configured formed from a material that exhibits auxetic behavior. This layer also may be referred to as an auxetic layer herein. The auxetic layer bends in two directions independently to provide a range of different Gaussian curvatures, including both positive and negative Gaussian curvatures, without necessarily being pliable under forces normal to its surface. While some materials become thinner in a direction perpendicular to an applied stretching force, an auxetic material either retains its width or becomes thicker in the direction perpendicular to the applied stretching force, and as such has a negative or zero Poisson's ratio.

Rather than use naturally auxetic materials, the disclosed examples utilize structural engineering approaches to form, from non-auxetic materials, a patterned layer that exhibit auxetic behavior. The patterned structures are designed to curve and stretch along two dimensions, and may be moved to create a wide variety of surface shapes. A plurality of individually controllable actuators may be positioned move the patterned layer to cooperatively change a curvature of the patterned layer in two dimensions to create a wide variety of surface shapes. The patterned layer further may be configured to be rigid to the touch, while being moveable by the actuators to change shape. In some examples, a haptic rendering device may include a tactile layer on a surface of the patterned layer to create a desired touch experience.

FIG. 1 shows aspects of an example display system 100 configured to present a virtual reality or augmented reality (e.g. a mixed reality) experience to a user 102. The display system 100 includes a head-mounted display (HMD) device 104, and a haptic rendering device 106. The HMD device 104 comprises a near-eye display 108 configured to display virtual imagery in the user's field of view (indicated by dotted lines 110). In some examples, the near-eye display 108 is opaque, providing a fully immersive virtual reality. In other examples, the near-eye display 108 comprises a see-through display, enabling real-world and virtual imagery to be admixed in the user's field of view 110 for an augmented or mixed reality experience. In the HMD device 104, signals encoding the virtual display imagery are sent to the near-eye display 108 via an on-board computing device 112. The on-board computing device comprises at least one processor 114 and memory 116, examples of which are described below with reference to FIG. 14. The HMD device 104 further includes loudspeakers that enable the user 102 to experience immersive audio, and may also include other input and/or output devices.

Leveraging communicating componentry arranged in the HMD device 104, the computing device 112 may be communicatively coupled to one or more off-board computing devices via a network. Thus, the virtual display imagery that the user 102 sees may, in some examples, be composed and/or rendered by an off-board computing device and sent wirelessly to the computing device 112. In other examples, the virtual display imagery may be composed and rendered on-board.

The haptic rendering device 106 is configured to provide an encounterable tactile experience for a user's hand 118. The haptic rendering device 106 moves an auxetic layer to simulate a shape of a displayed virtual object, thereby mapping haptic output to displayed virtual imagery. In this example, the HMD device 104 displays a virtual dog 120 and also displays a virtual hand 122 that the user 102 controls via movement of their real hand 118. As the user 102 moves their hand 118 across the haptic rendering device 106, the haptic rendering device 106 changes shape based on a contour of the virtual dog 120 at a location where the user's hand 118 interacts with the virtual dog 120, thereby "rendering" a shape of the surface of the virtual dog 120. As a surface at which the user 102 interacts with the haptic rendering device 106 is smooth, the user 102 does not feel discontinuities between actuators of haptic rendering device 106 while moving their hand 118 across the device. In some instances, the haptic rendering device 106 is configured as a stationary device that a user moves their hand across to experience different surface shapes. In other instances, the haptic rendering device 106 may be configured as a moveable device, similar to a computer mouse, which a user moves across a real-world surface (e.g. table surface 124) and a surface of the haptic rendering device 106 adapts as according to the movement. In any instance, the haptic rendering device 106 may provide a continuous sense of an object such that a surface being felt by the hand 118 is perceived to be a continuation of a same virtual surface.

The display system 100 may use the coordinate system of the HMD device 104 to calculate a registration between a visual model and a physical model, for example by measuring points on a surface of the haptic rendering device 106 together with corresponding virtual points on the surface. From this, a rigid affine transformation can be calculated to register a displayed visual shape to a rendered physical shape.

In some examples, the display system 100 also may obtain information regarding a pose (position and/or orientation) and/or movement of a body part that interacts with the haptic rendering device 106, which may be used to control a pose and/or movement of the virtual hand 122. In some examples, one or more image sensors (depth and/or two-dimensional) integrated with or external to the HMD device 104 may be configured to obtain image data of the haptic rendering device 106 and a body part that interacts with the haptic rendering device 106, such as a hand or a finger. Various classification techniques may be utilized to identify the hand 118 (or other body part) in the image data. Alternately or additionally, a user may wear an optical and/or inertial tracking device communicatively coupled to the HMD device 104, which may be used to track a pose of a body part. In some instances, the image data may be compared to one or more filters defining known poses and gestures to determine whether the body part is performing a known pose or gesture. Locations of pixels or voxels corresponding to the body part identified in the image data also may be compared between image frames and compared to a movement threshold, to determine whether the body part moved between image frames. Further, the haptic rendering device 106 may optionally include integrated sensors (e.g. one or more capacitive touch sensors) that sense interactions between a body part and the haptic rendering device 106. Further, the haptic rendering device 106 may optionally include inertial motion sensors to track movement of the haptic rendering device 106 by a user.

To modify the shape presented by the haptic rendering device 106, object information for one or more virtual objects within a user's environment may be maintained by the on-board computing device 112, the haptic rendering device 106, and/or a remote computer in communication with the HMD device 104 or haptic rendering device 106. The object information may include information regarding a position (absolute and/or relative), orientation, and shape of each virtual object in a virtual environment. Based on the pose of the body part 118 relative to a virtual display object, the haptic rendering device 106 may be controlled to match a curvature of the virtual display object at a location where the body part 118 (or virtual body part 122) intersects the virtual display object 120 or is predicted to likely intersect the virtual display object 120.

The haptic rendering device 106 may additionally or alternatively be configured to modify an expressed shape based on movement of the haptic rendering device 106 within a use environment, such as along a surface of the table 124 in FIG. 1. For example, the surface of the table 124 may be registered with a displayed terrain, and the haptic rendering device 124 may change shape to match the displayed terrain as the user 102 moves the haptic rendering device 106 along the table surface 124.

Figure 2:
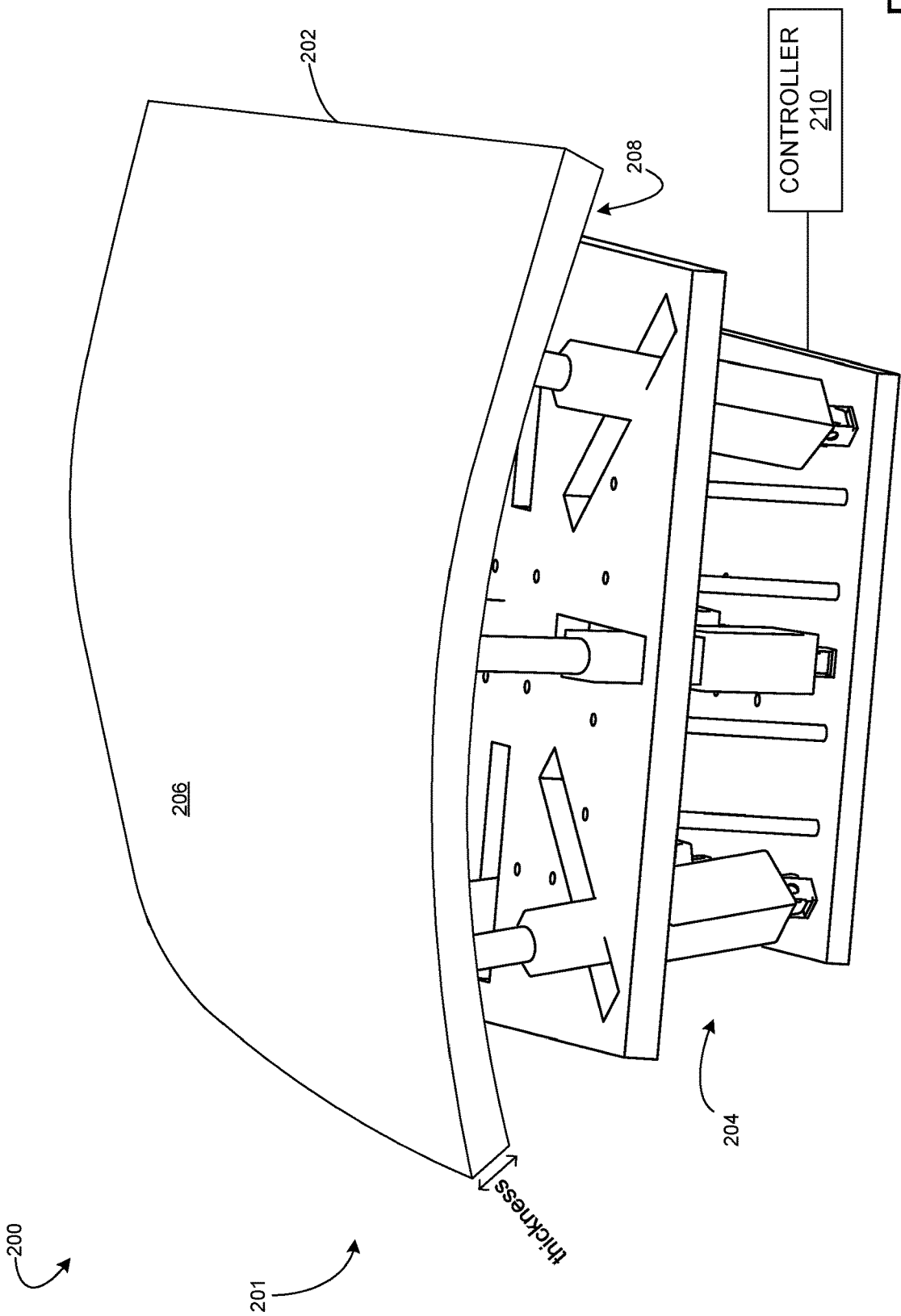
FIG. 2 shows an example haptic rendering device in which a patterned layer is moved to express a convex hill shape.

FIG. 2 depicts an example haptic feedback system 200 comprising a haptic rendering device 201 that may be used as the haptic rendering device 106 in FIG. 1. The haptic rendering device 201 comprises a patterned layer 202 that exhibits auxetic behavior, and an electromechanical actuation system 204 configured to impart curvature to the patterned layer 202. The patterned layer 202 is engineered, via a pattern imparted in the material, to flex and stretch in two directions without being compliant to user touch.

The patterned layer 202 is formed from a non-auxetic material that is structurally engineered to behave similarly to naturally auxetic materials, and thus to exhibit auxetic behaviors. Examples of materials suitable for forming the patterned layer 202 include polymeric, metallic, and composite materials that have a toughness and rigidity to withstand a pattern-imparting manufacturing process (e.g. laser jet cutting and/or water jet cutting). Such materials may also be selected to resist drooping when unsupported by an actuator. In one specific example, the patterned layer 202 comprises a polycarbonate sheet. Further, in some examples, the patterned layer 202 may comprise an electrically conductive material, which may enable capacitive touch sensing and/or other embedded sensing applications (e.g. pressure sensing to manipulate a virtual object by pressing on the patterned layer 202).

In addition or alternatively to removal processes (machining via water jet, laser cutter, etc.), addition processes may be used to form the patterned layer 202. Example addition processes suitable for forming the patterned layer 202 include molding, casting, and/or three-dimensional printing. In any instance, the pattern is formed through an entire thickness of a material which forms the patterned layer 202, such that the material which forms the patterned layer 202 remains continuous. This allows the patterned layer 202 to bend into nondevelopable shapes. As described in more detail below, a spacing of mechanical fixtures in the electromechanical actuation system 204 may influence the material, size, and pattern selected for the patterned layer 202.

Figure 3:
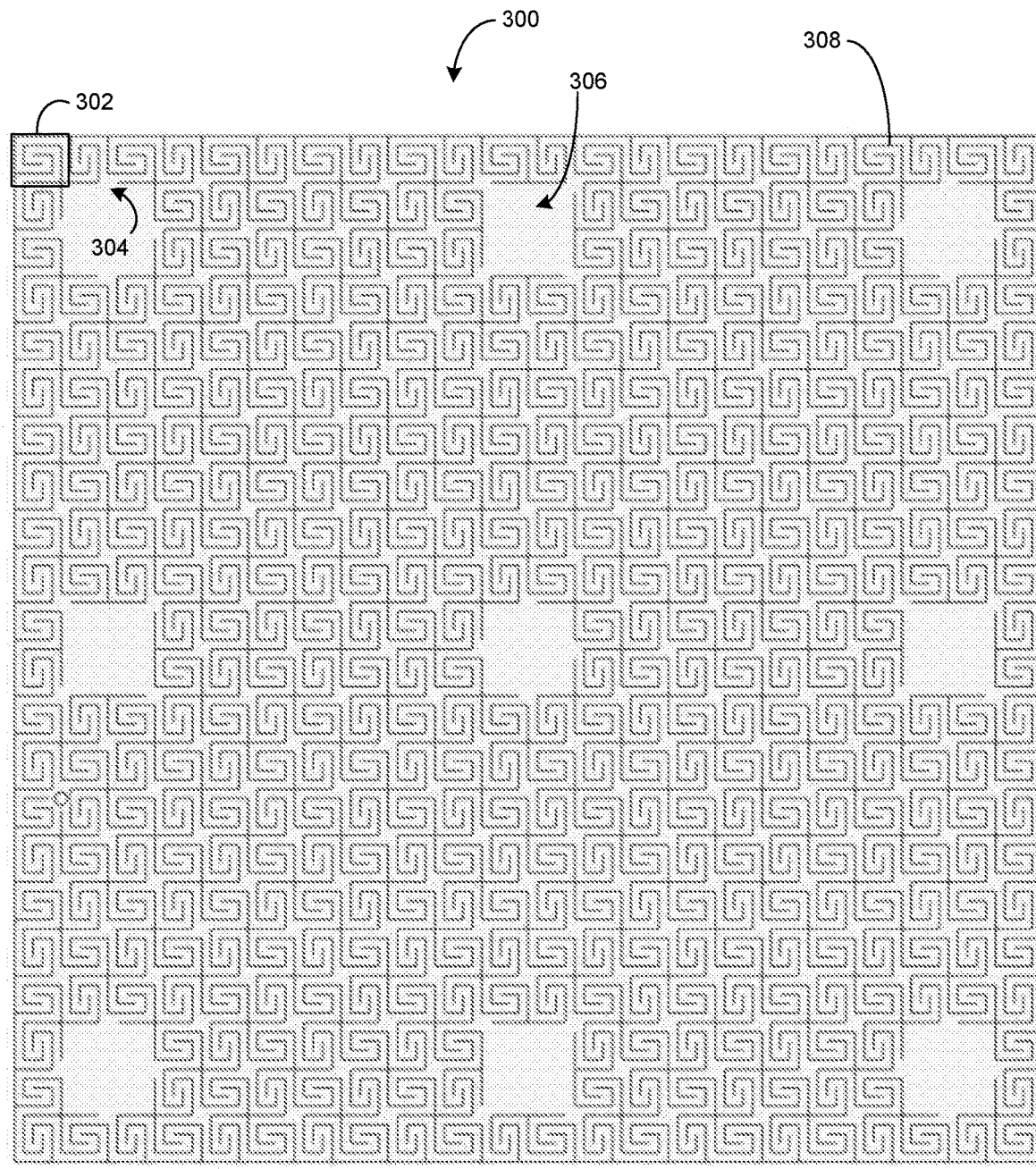
FIG. 3 schematically shows an example patterned layer for the haptic rendering device of FIG. 2.

FIG. 3 depicts an example pattern 300 (as viewed from a surface 206 at which a user interacts with the patterned layer 202 in FIG. 2) useable to provide auxetic behavior to a non-auxetic material. The pattern 300 is a repeating spiral pattern—in this example, repeating Archimedean spirals 302—which can be used to provide double curvature to a flat sheet. The space-filling curve of the pattern 300 includes connections 304 between the repeating spirals 302, which may provide flexibility to even strong and somewhat inflexible structures (e.g. a 5-10 mm thickness polycarbonate sheet). Each spiral 302 occupies a 10 mm square in this example, but may comprise another size or varying sizes in other examples. The pattern 300 also retains most of the surface area from which the pattern is cut, and thus may provide support for an optional tactile layer, described below in more detail.

Various patterns other than the pattern 300 may be used to form the patterned layer 202. As the pattern provides the auxetic behavior exhibited by the patterned layer 202, any pattern or shape that enables such auxetic behavior may be used. Example patterns include patterns comprising a substantial amount of void space, such as 40 to 60% void space by volume, which may allow the patterned layer 202 to bend in two dimensions. Further, the pattern comprise symmetry in some examples. In any instance, via the pattern, a material from which the patterned layer 202 is formed acquires flexibility and stretch not found in the unpatterned material.

When flexed, the patterned layer 202 may raise surface features at an interface between a material which forms the patterned layer 202 and void space of the pattern. To prevent perception of these surface features, a haptic rendering device 201 may comprise an optional tactile layer at the surface 206 at which a user interacts with the haptic rendering device 201, as mentioned above. The tactile layer may comprise a stretchable and flexible structure, which may be continuous or discontinuous. Examples of materials suitable for use as the tactile layer include soft elastomeric materials, fabric materials, and metallic materials (e.g. a plurality of metal pieces arranged on the surface 206). Further, in some examples, a tactile layer may include different materials at different locations of the surface 206 to provide different haptic experiences. For example, in VR/MR/AR applications, a user may be directed to touch different portions of the surface 206 to experience different textures, hardnesses, etc.

In some examples, the tactile layer comprises a layer of material that is adhered or otherwise attached to the surface 206. In other examples, the tactile layer may be molded, cast, injected, or otherwise formed around the patterned layer 202, thereby filling or partially filling the void space. In some examples, forming the tactile layer may include forming the tactile layer on multiple surfaces of the patterned layer. In one specific example, forming the tactile layer comprises molding a 30A Shore hardness silicone rubber on the surface 206, partially curing the material, and then molding the 30A Shore hardness silicone rubber on a surface 208 of the patterned layer 202 opposite the surface 206. Returning to the example shown in FIG. 3, the patterned material 306 may be optically clear, whereas filler 308 (e.g. a tactile layer that fills the void space) may be diffuse. In other examples, both the patterned material and optional filler may be optically clear, opaque, and/or have any other suitable appearance. The discernibility of the pattern 300 may be obfuscated, in some instances, by painting a surface (206 and/or 208) of the patterned layer or by index-matching materials which form the pattern layer 202 and the tactile layer.

The type and thickness of material which forms the patterned layer 202, as well as the pattern of the patterned layer 202, may be selected to obtain a stiffness that allows the patterned layer 202 to form various shapes while having sufficient rigidity between points at which actuators contact the patterned layer 202 to interpolate the areas between the actuators. When a user touches the surface 206, the user may perceive single and double curvature of various types, depending upon the movement of the electromechanical actuation system 204.

Figure 4:
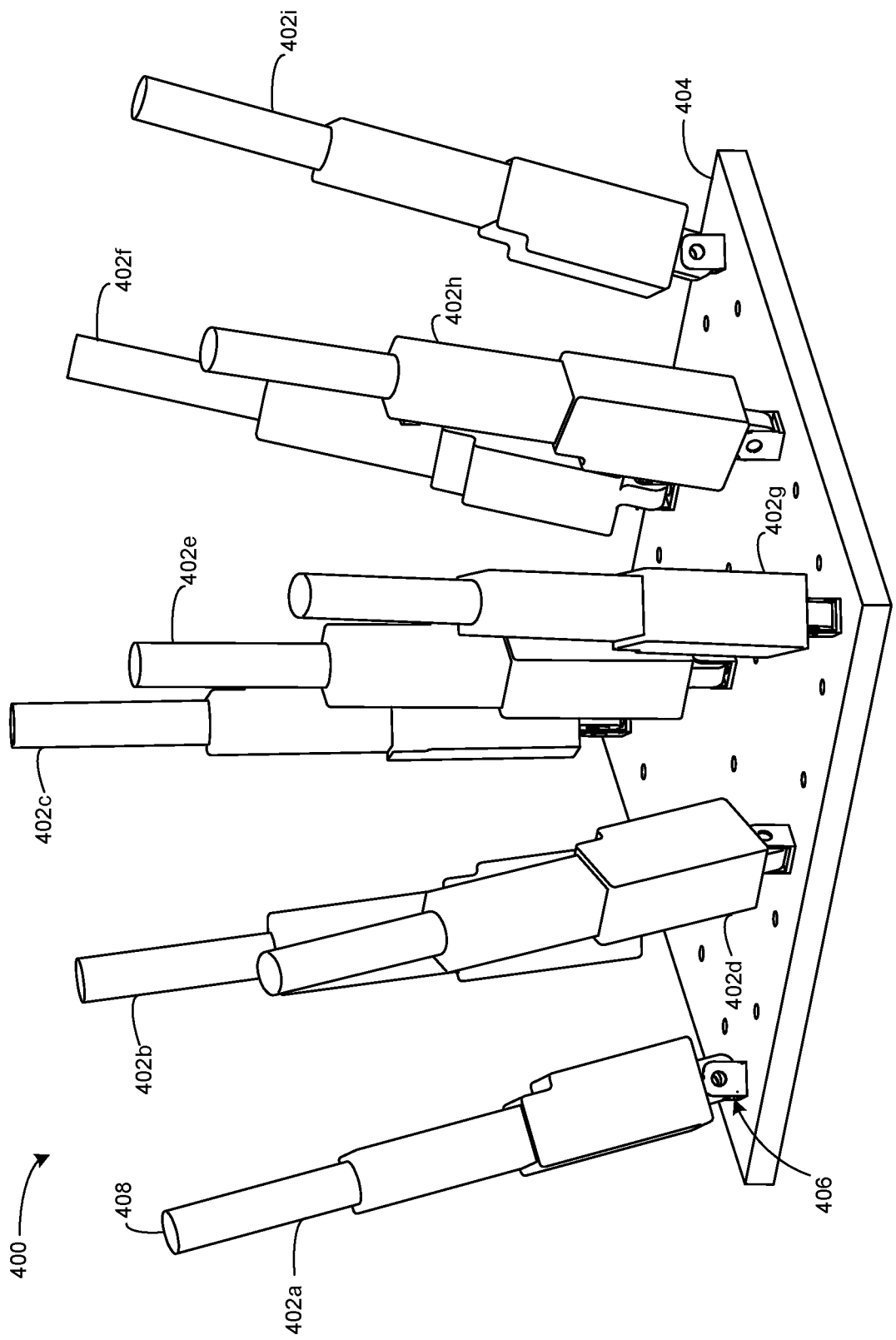
FIG. 4 shows an example actuator assembly for the haptic rendering device of FIG. 2.

FIG. 4 depicts an example electromechanical actuation system 400 suitable for use as the electromechanical actuation system 204. A quantity k of actuators which contact an underside (208 in FIG. 2) of a patterned layer at k points may be selected to generate a sufficient vocabulary of surfaces for a given application, and such that areas of the patterned layer between the k points are able to physically approximate a surface defined by the plurality of actuators. In the depicted example, the electromechanical actuation system 400 includes nine actuators 402a-402i, which allows a haptic rendering device to approximate both convex and concave surfaces in two dimensions. The use of nine actuators may provide sufficient expressiveness for a palm of a hand to distinguish between concave and convex surfaces, even without moving the hand along a curvature of the surface. In other examples, any other suitable number of actuators may be used.

Each actuator may comprise any suitable structure that, when actuated, applies force to displace an underside (208 in FIG. 2) of the patterned layer. In the depicted example, the actuation system includes nine linear actuators 402a-402i. While shown as fully extended, the linear actuators 402a-402i may be controlled to telescope to different heights relative to a frame 404. A central actuator 402e controls an elevation of the patterned layer relative to the frame 404, and eight perimeter actuators 402a-402d and 402f-402i enable the patterned layer to be curved in a convex and/or concave configuration. The extension range, speed, maximum force, and/or other parameters of the linear actuators may be selected to help prevent back driving when the actuation system is static. Example linear actuators suitable for use include L12-R micro linear servos available from Actuonix of Victoria, B.C. Canada, which have an extension range of 50 mm, a speed of 6.8 meters/second, and a maximum force of 80 Newtons.

Each actuator 402a-402i is configured to move in one dimension, e.g. by changing an extension length of the actuator. When two nearby actuators move in opposing directions (e.g. up and down), the actuation stretches an area of the patterned layer between the points at which an end 408 of each actuator contacts the patterned layer. In some examples, to reduce stress in the patterned layer, one or more actuators may be connected at a first end to the frame via a mechanical coupling 406 (e.g. a bracket) that permits the actuator to move relative to the frame 404. While each linear actuator 402a-402i is controlled to move in one dimension by changing an extension height, the depicted mechanical coupling 406 permits an actuator to pivot. In other examples, the actuators may be connected to the frame 404 in any other manner. In some examples, different actuators may be connected via different types of mechanisms.

Figure 5:
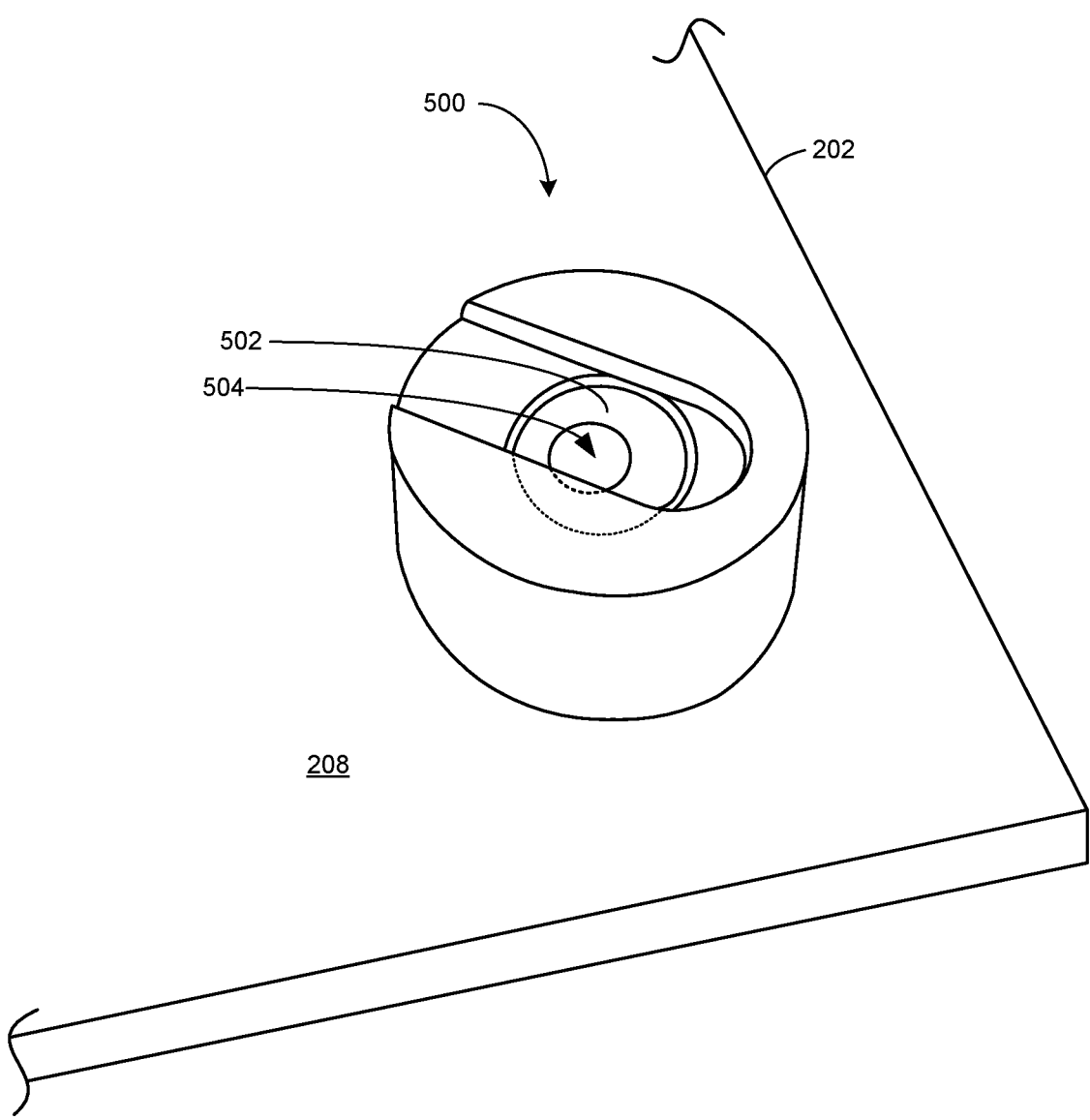
FIG. 5 shows an example socket connection at which the patterned layer of the haptic rendering device of FIG. 2 may be connected to an actuator.

In addition to a pivotable connection to the frame 404, one or more actuators may be connected to the patterned layer in a non-rigid manner that permits rotation of the actuator about the connection point, which may further help to reduce stress in the patterned layer. FIG. 5 depicts an example ball and socket joint 500 useable to connect an end of an actuator connects to the underside 208 of the patterned layer 202. The ball and socket joint 500 comprises a housing 502 mounted on the underside 208 of the patterned layer 202, and a ball bearing 504 including an interior screw thread 506 positioned within the housing 502 to attach to a corresponding threaded end of an actuator. When an actuator is connected to the patterned layer via the ball and socket joint 500, the ball and socket joint 500 allows the actuator to move relative to one or more other actuators, which may help to reduce stress on the patterned layer as the patterned layer changes shape. In other examples, an actuator may be configured to move the patterned layer without being coupled to the patterned layer. For example, an underside (208 in FIG. 2) of the patterned layer may include indents configured to grip the opposite end 408 of the actuator at a contact point without being mechanically coupled to the actuator.

A spacing between actuators of a haptic rendering device may influence the type and quantity of shapes that the patterned layer interpolates. In some examples, the spacing between actuator connections to the frame 404 may be narrower than a spacing between actuator connections or contact points on the underside of the patterned layer. This may provide a closer-to-orthogonal angle between each actuator and the patterned layer over a larger range of shapes compared to equivalent spacings between actuators at the frame and patterned layer.

Figure 6:
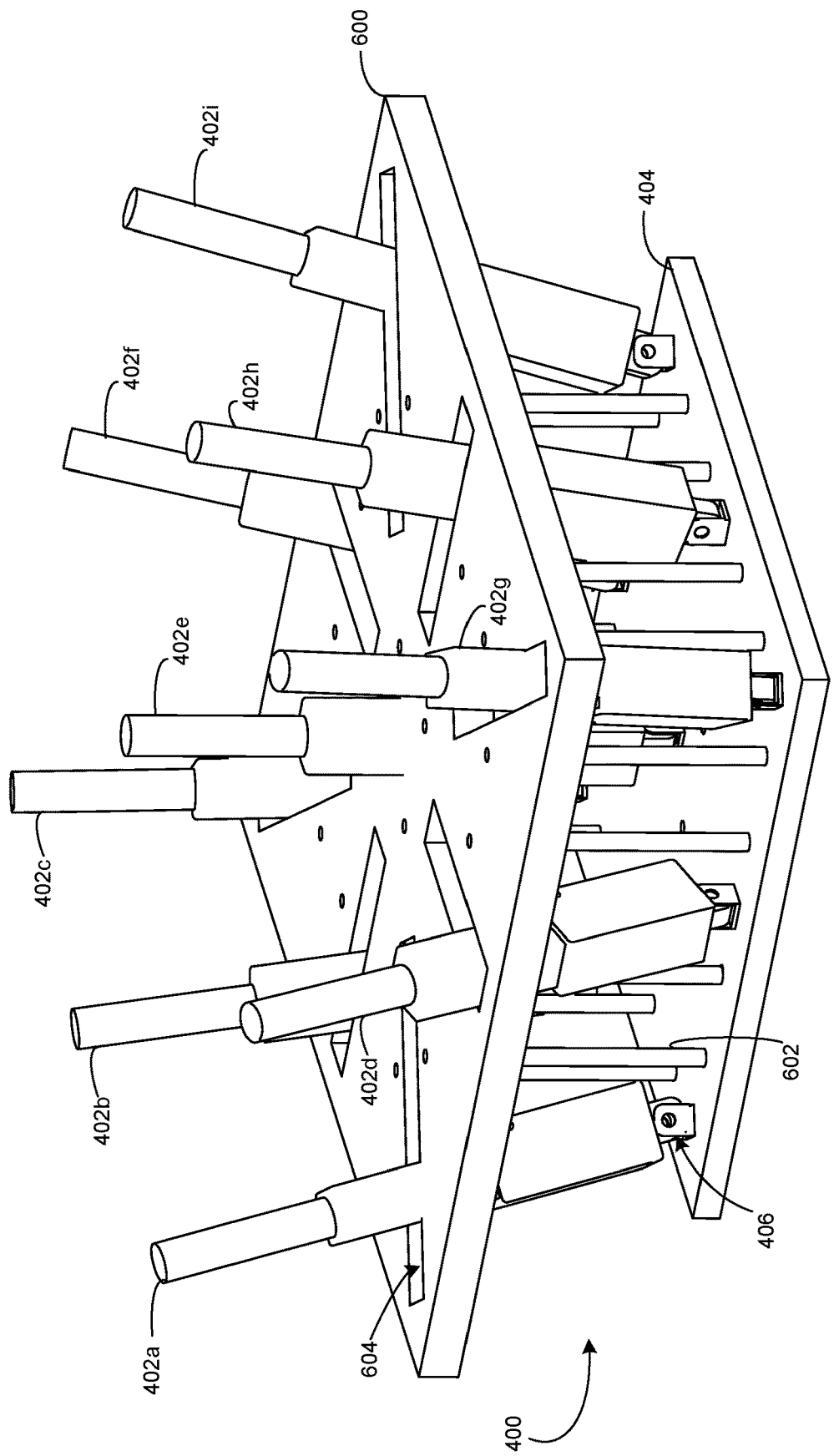
FIG. 6 shows the example actuator assembly of FIG. 4 with an optional constraining plate.

A haptic rendering device may optionally include a mechanical assembly that constrains movement of the actuators. Such an assembly also may help to protect the actuators from damage. FIG. 6 depicts an example mechanical assembly in the form of a constraining plate 600 connected to the frame 404 via supports 602. The constraining plate 600 may permit the actuators to actuate a patterned layer within a certain range (e.g. two degrees of freedom for perimeter actuators 402a-402d and 402f-402i and one degree of freedom for central actuator 402e), as well as prevent other free movement. In this example, the constraining plate 600 allows the central actuator 402e to move in a strictly linear and vertical direction, and prevents unintended lateral motion. Further, the depicted constraining plate 600 includes slots 604 that allow each perimeter actuator 402a-402d and 402f-402i to rotate in a plane defined by the mechanical coupling 406 which connects the actuator to the frame 404. In this example, the planes of rotation of each perimeter actuator 402a-402d and 402f-402i pass through a vertical line through the center of the central actuator and are rotationally symmetric.

Figure 7:
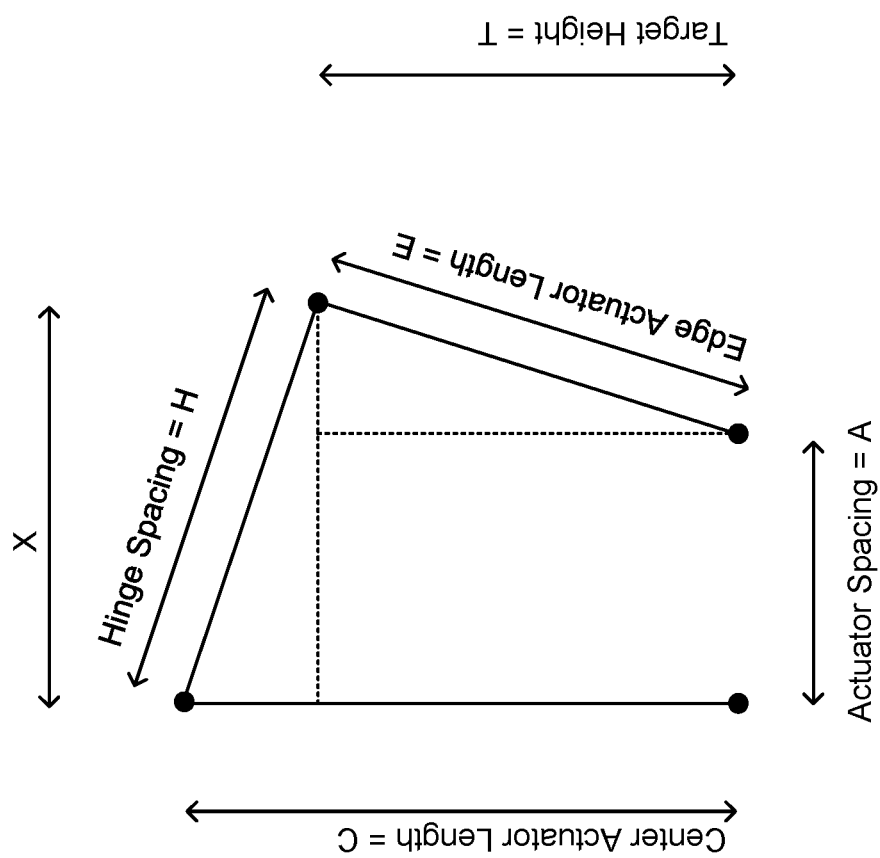
FIG. 7 schematically shows a geometrical representation of the relative positions of two actuators.

A simulation for rendering a three-dimensional surface via a haptic rendering device as disclosed may be based, for example, on a geometric proxy that mirrors the physical structure. In some examples, such a simulation may be developed using a game engine. An initial simplifying assumption—that the surface is inextensible along lines that are radial from the center to the actuators—may be made, and the control system starts with a (3×3) matrix (or other size matrix, depending upon the quantity of actuators used) of target heights of the surface points. In one virtual prototype, these heights are controlled by blending target sets of heights that represent simple shapes, such as bowls, hills, saddles, and cylinders. The target actuator lengths may then be determined, for example, as follows. First, as the central actuator 402e may be configured to move in a purely vertical direction, the actuator length of the central actuator 402e may simply be the target height. The four edge actuators 402b, 402d, 402f, 402h positioned along edges of the frame may then be set by the construction shown in FIG. 7, where:

$$X=\sqrt{H^2-(C-T)^2}$$

$$E=\sqrt{(X-A)^2+T^2},$$

and where C is the length of the center actuator (in mm, determined prior), H is the spacing of an edge connection point (e.g. a ball and socket joint) from center across patterned layer (fixed at 90 mm), A is the spacing of an actuator from center across base (fixed at 60 mm), T is the target height (in mm), and E is an edge actuator length to be determined (in mm).

The above Gaussian functions are based on a center actuator length C, which is determined first as described above. Next, the length of the four corner actuators 402a, 402c, 402g, and 402i may be determined by a similar method, where H and A are now multiplied by $\sqrt{2}$. In the example depicted in FIG. 4, the linear actuators each have a 50 mm range, and thus a range from 130 mm to 180 mm with the length of a coupling on a patterned layer.

In some examples, a haptic rendering device may receive, from a remote source, instructions for each actuator to express a particular shape. In other examples, a haptic rendering device may receive an instruction regarding a shape to be rendered and translate the specified shape into actuator commands to control the plurality of actuators to cooperatively express the specified shape. Any suitable control circuity may be used to control the plurality of actuators 402a-402i. In one specific example, the plurality of actuators may be individually controlled by a multi-channel servo controller communicatively coupled with a host computer (e.g. an HMD device or other computing device).

During use, the controller 210 may send commands to update a shape expressed by a haptic rendering device within a frame rate of an associated VR, AR, or MR application (e.g. 90 Hz). While the controller may receive and execute a control instruction in a trivial timeframe, an actuator may take a longer time to move to a next position. Thus, in some instance, a display system (e.g. display system 100) may be configured to predictively set an initial state of the haptic rendering device when a user is observed to "touch" or predicted to touch a new virtual surface. This anticipation may be based, for example, on a gaze direction of the user as determined via an eye tracking camera. Once a user makes contact with a virtual object, and until the user disconnects contact, the haptic rendering device may incrementally change shape in response to any continuous movement of the user's hand/finger over the virtual object. The controller 210 may also be configured to predict changes to a displayed shape based upon hand motion vectors, eye tracking, and/or other information.

Figure 8:
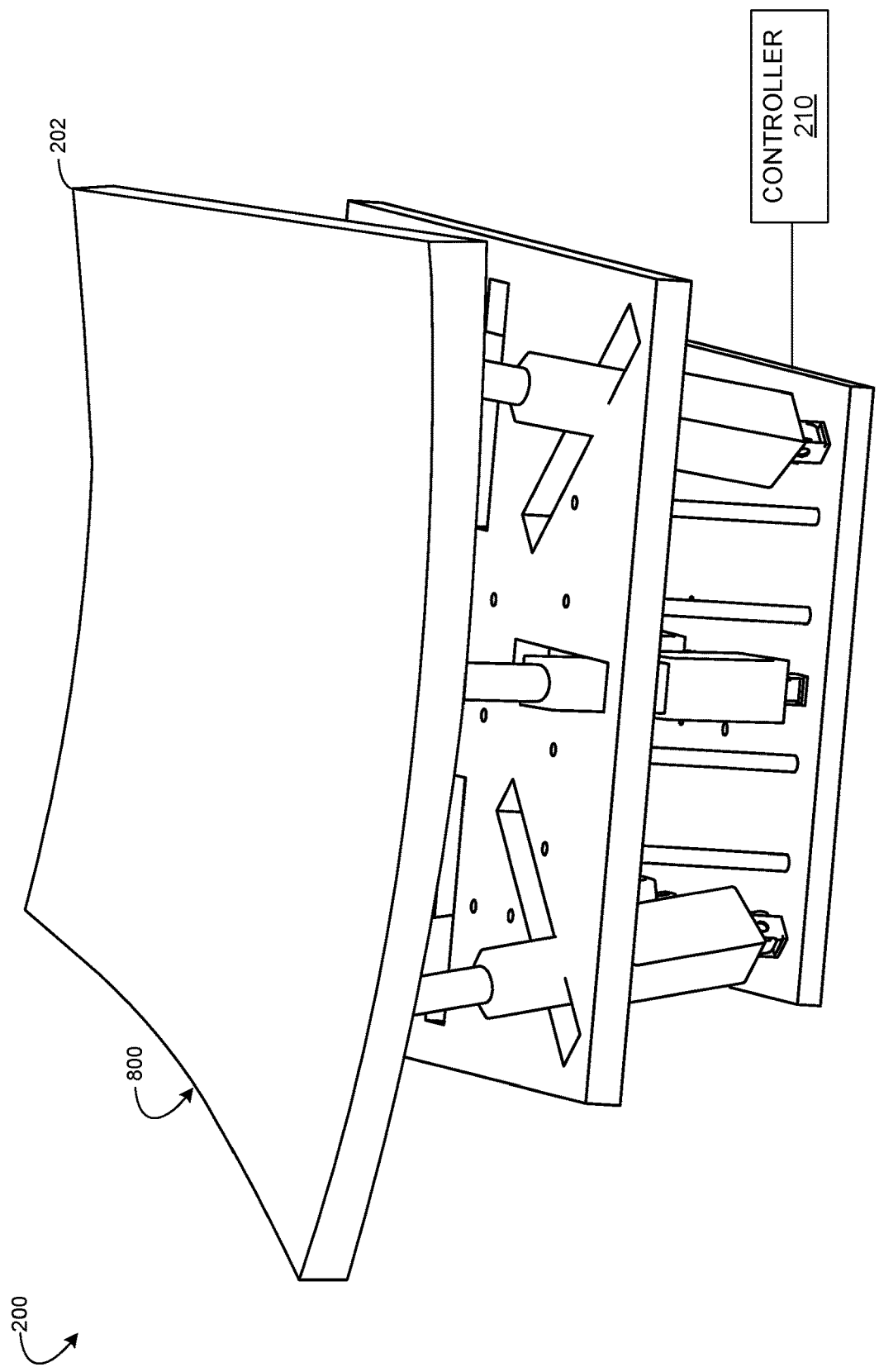
FIG. 8 shows the example haptic feedback system of FIG. 2, and depicts the patterned layer configured in a concave bowl shape.
Figure 9:
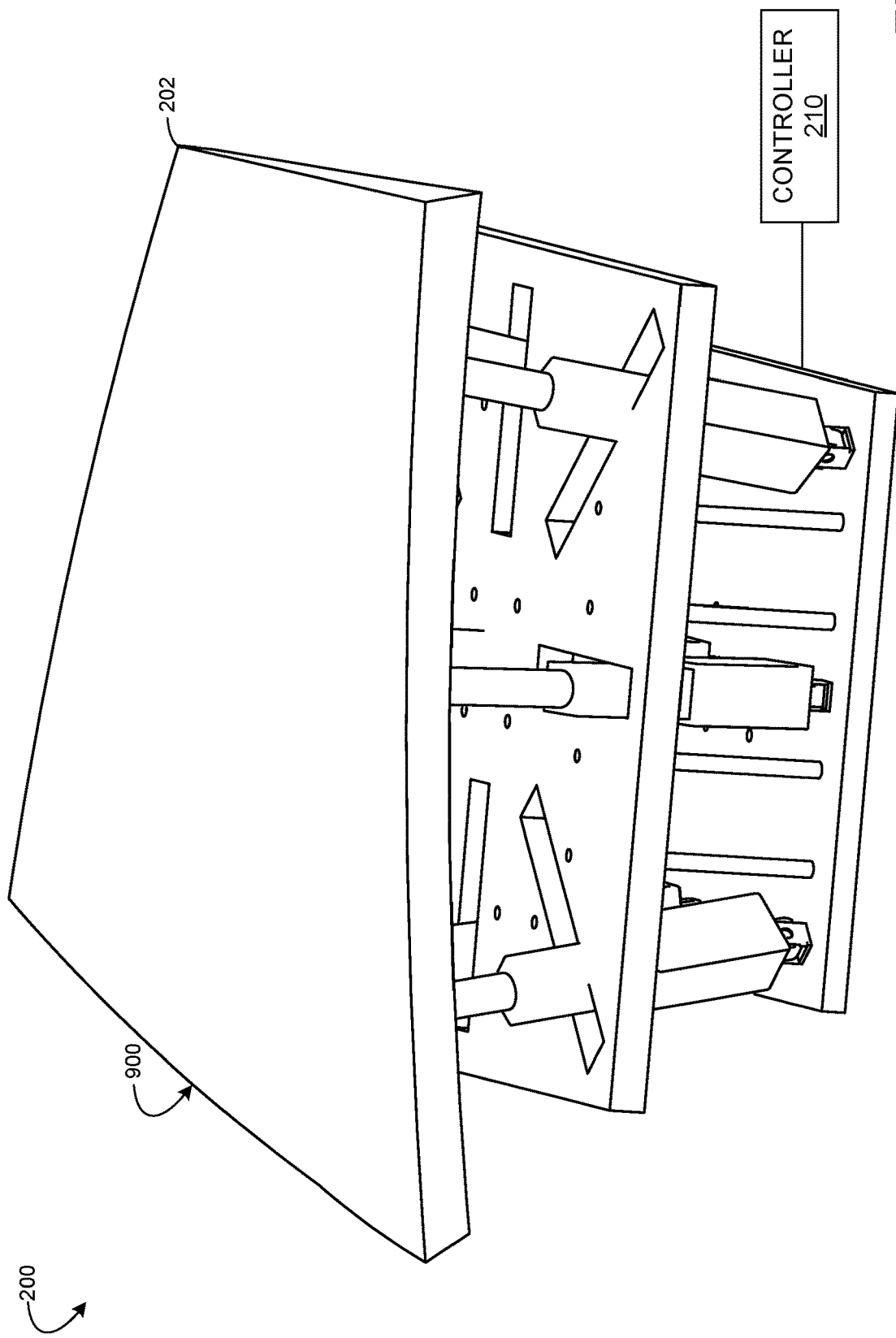
FIG. 9 shows the example haptic feedback system of FIG. 2, and depicts the patterned layer configured in a saddle shape.
Figure 10:
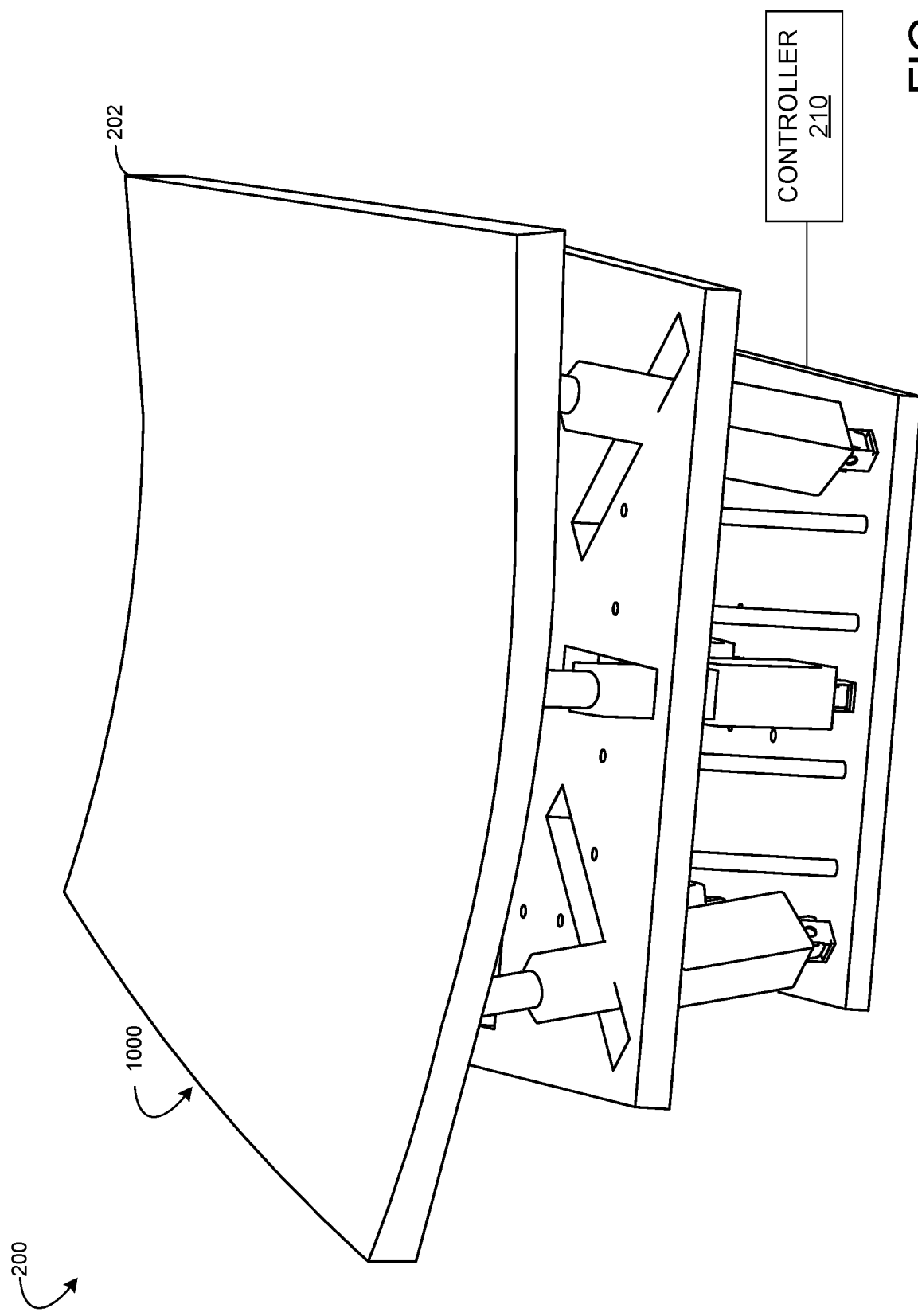
FIG. 10 shows the example haptic feedback system of FIG. 2, and depicts the patterned layer configured in a concave cylinder shape.

In FIG. 2, the patterned layer 202 is actuated to express a hill shape that has positive Gaussian curvature. Examples of other shapes that may be achieved by the haptic feedback system 200 are shown in FIGS. 8-10. In FIG. 8, the haptic feedback system 200 actuates the patterned layer 202 to express a bowl shape 800, which also has positive Gaussian curvature. The saddle shape 900 expressed in FIG. 9 has negative Gaussian curvature. In FIG. 10, the haptic feedback system 200 actuates the patterned layer to express a cylinder shape 1000—a shape that may also be formed with non-auxetic behaving materials. Each of the shapes shown in FIGS. 2 and 8-10 is achieved by a smaller number of actuated elements than would be utilized to achieve suitably similar resolution shape using a pin-array (e.g. nine actuators compared to around one thousand pins). In addition to improve costs and reliability provided by the reduced number of actuated elements, the example haptic feedback systems disclosed herein provide a continuous sense of a surface and thus a potentially more realistic touch and feel than discrete surfaces.

Figure 11:
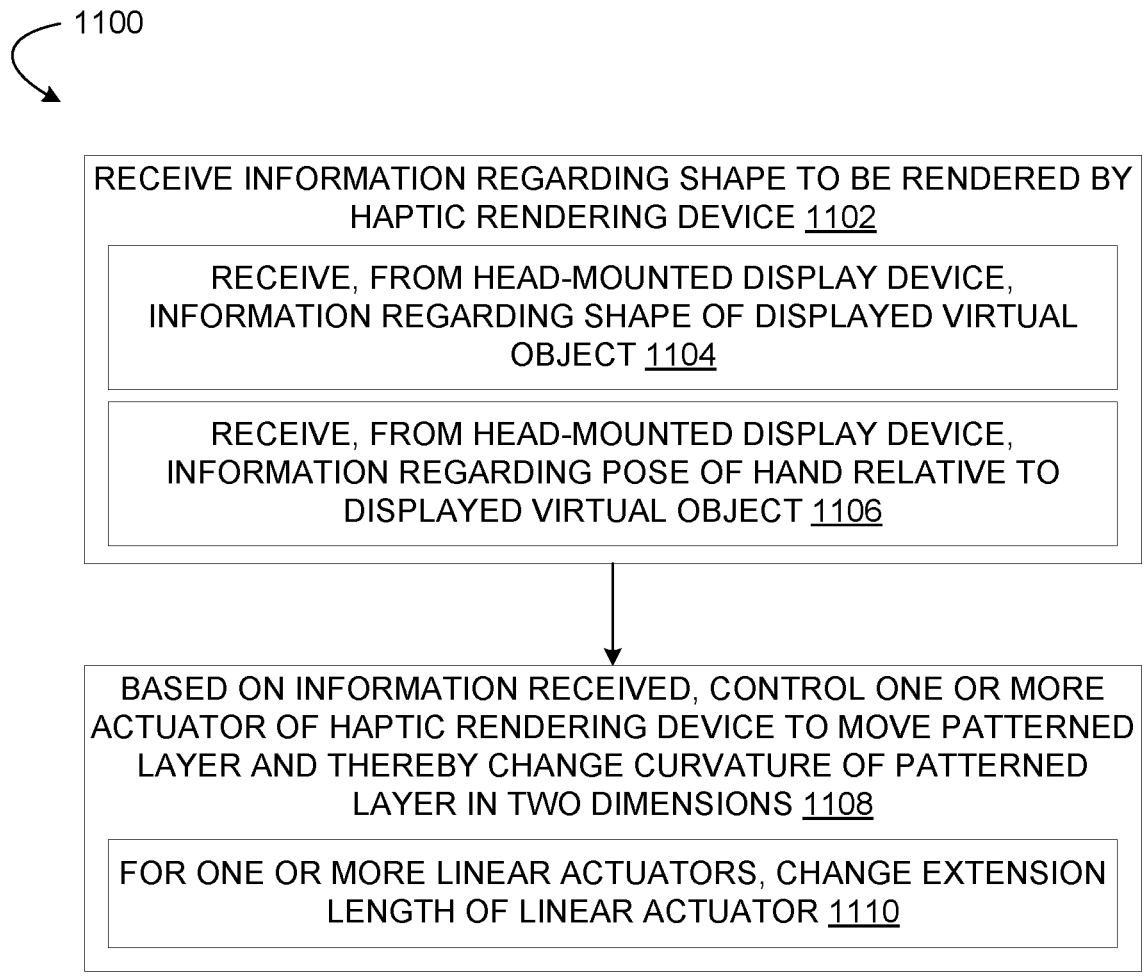
FIG. 11 is a flow diagram illustrating an example method of operating a haptic rendering device.

FIG. 11 shows a flow diagram illustrating an example method 1100 of operating a haptic rendering device, such as haptic rendering device 201. Method 1100 may be implemented as stored instructions executable by a controller (e.g. controller 210) of a haptic rendering device.

At 1102, method 1100 comprises receiving information regarding a shape to be rendered by the haptic rendering device. In some examples, receiving the information may comprise receiving, from an HMD device, information regarding a shape of a displayed virtual object, as indicated at 1104. Receiving the information also may comprise receiving, from the HMD device, information regarding a pose of a hand relative to the displayed virtual object, as indicated at 1106. In other examples, receiving the information may comprise receiving actuator commands specifying adjustments to be made to one or more actuators.

Based on the information received, method 1100 comprises, at 1108, controlling one or more actuators of the haptic rendering device to move a patterned layer of the haptic rendering device, and thereby cooperatively change a curvature of the patterned layer in two dimensions. In some examples, the actuators of the haptic rendering device may comprise linear actuators and controlling the one or more actuators may comprise changing an extension length of a linear actuator, as indicated at 1110.

No aspect of the foregoing description should be understood in a limiting sense, for numerous variations are contemplated as well. While the depicted patterned layer 202 is sized to support full-hand interaction, a haptic rendering device also may comprise a larger or smaller form factor in various examples. In some examples, a haptic rendering device may optionally include a hierarchy of actuators to provide higher detail tactile feedback at one or more portions of the patterned layer, e.g. to provide finer interactions against a fingertip than a palm. Further, a haptic rendering device may optionally include integrated touch and/or pressure sensors, and one or more actuators may be controlled to modify shape in response to a sensed touch and/or pressure input.

While the depicted examples show a haptic rendering device as having one modifiable surface (patterned layer 202), a haptic rendering device may also be configured as a three-dimensional object, such as a cube or sphere, with multiple moveable surfaces and actuators positioned in the interior of the object. As another example, a haptic rendering device may include two opposing patterned layers configured to be held between two hands to simulate a tactile experience of holding a virtual object or moving both hands around a virtual object. Further, a haptic rendering device as described herein may be a component of another construct, such as a robotic arm that follows movement of a user's hand within a use environment.

Experimental Results

The haptic feedback system 200 was tested by examining an ability of users to explore and perceive curvature of an object.

Experiment 1

To validate the ability of the haptic rendering device 201 to render different types of objects, a study was conducted in which seventeen participants (n=17) selected which of four shapes (a convex hill shown in FIG. 2, a convex tube, a concave bowl shown in FIG. 8, and a concave cylinder shown in FIG. 10). Three different curvature levels (radius of curvature (r)=25 mm, 10 mm, and 5 mm) of the patterned layer 202 were tested. Participants had an overall accuracy of 80% when the haptic rendering device 201 presented curvatures over r=25 mm, and the accuracy dropped to 42% when the curvature was of r=5 mm.

Figure 12:
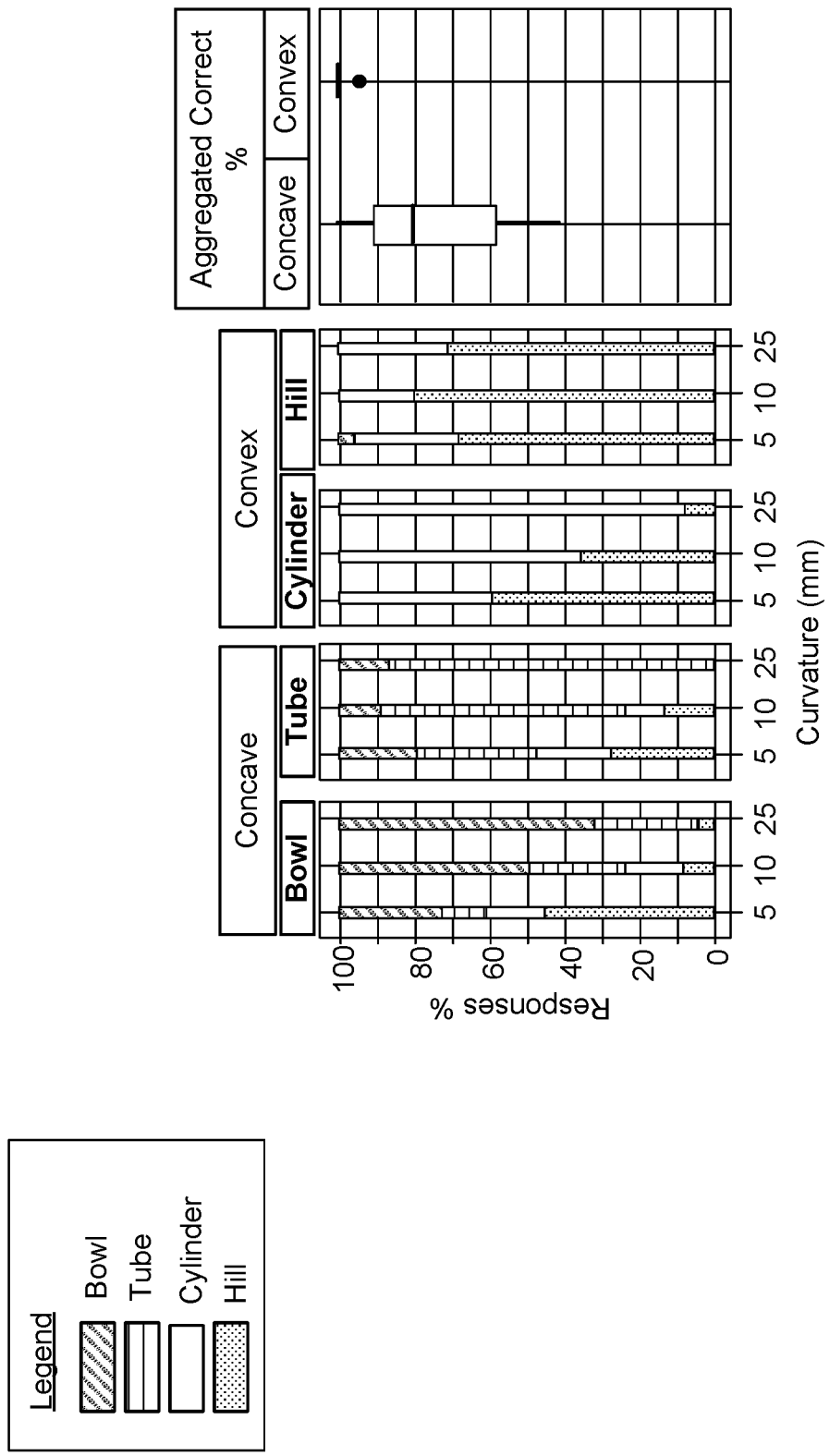
FIG. 12 shows experimental results representing classification responses of participants when presented with a particular shape in different curvatures.

A paired Friedman analysis showed that not all of the tested shapes were equally recognized ($\chi 2$=13.6, df=3, p=0.033). Referring to FIG. 12, the most recognizable surface was the convex hill, with a 75% accuracy across all curvatures, and reaching 80% accuracy for curvatures over 10 mm. Convex hill shapes were significantly more recognizable than the two concave shapes, as indicated by a Conover test with Bonferroni adjustment p<0.001. No significant difference in recognition was found between the convex hill and the convex cylinder (p=0.09). The convex cylinder also showed high accuracy scores of 66%, being maximal with curvatures of 25 mm at 92% recognition. These results validate the ability of the haptic rendering device as a proxy for haptic perception of shapes of different curvatures. Shapes which present convexity are particularly well recognized, which may in part be related to the anatomical shape of the human hand.

Experiment 2

Experiment 2 sought to better understand a resolution of the haptic rendering device 201. Participants underwent a forced paired test inside a VR use environment, in which each user selected which of two shapes they perceived to exhibit higher curvature. To avoid other types of errors not related to resolution, the convex hill shape (the most accurately identified shape in Experiment 1) was selected for this experiment. Participants were presented a shape on a convex hill with different heights. The lowest height experienced was of 5.5 mm radius of curvature, and the most dramatic height was of 25 mm radius of curvature. A completely flat shape was not presented, to avoid bias in the participants' assessments.

At each iteration of the paired-comparisons, one of the curvatures was always at the minimum height (5.5 mm). The assignment of which curve was presented first or second was randomized. If participants chose correctly the shape with greater curvature, the experiment diminished the curve level for the forthcoming paired comparison. When participants made a mistake, the experiment moved three levels up in curvature. Participants could make a total of three mistakes. The levels at which participants made a mistake were considered the perceptual thresholds of the participant.

This experiment included three different conditions for determining which shape exhibited higher curvature. Given the size of the haptic rendering device 201, participants may decide to touch a surface with a single finger, with multiple fingers or with the full palm. To test this variability, participants performed the curvature assessment under the following exploration conditions, which were counterbalanced with Latin-square: one finger—participants performed the assessment after having touched the surface only with their index finger; two fingers—participants used their index and middle fingers to touch and assess the surface curvatures; full hand—participants explored the surface with a full palm.

Hand position was tracked using a wireless tracking device attached to the wrist and tracked by a virtual reality HMD device. Finger-level tracking was not included, to reduce tracking mismatch errors and to permit unencumbered hand exploration of the haptic rendering device. Participants viewed a virtual hand matching a condition that would move at the wrist level.

Figure 13:
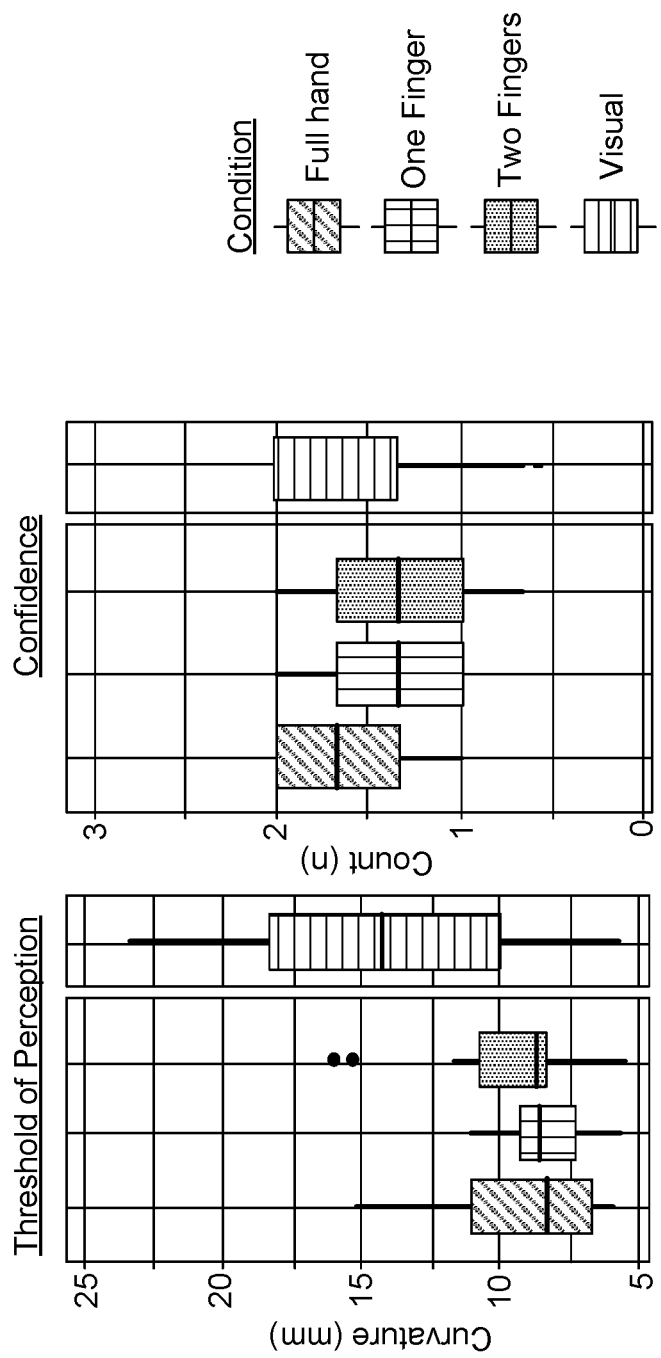
FIG. 13 shows experimental results representing perceived curvature responses of participants when presented with a particular shape in different curvatures.

The mean threshold reached by each participant in the three tries was calculated, results of which are shown in FIG. 13. A non-parametric paired Conover Test was also run. The exploration with two fingers demonstrated worse detection of curvatures than use of a single finger or full hand (Paired-Conover test p=0.022). No significant differences were found on the accuracy between the one finger or a single hand (p=1). The threshold accuracy was combined with a study of confidence. Given the experimental design it is considered that the more times a participant reaches the threshold, the greater the confidence that the threshold is the actual threshold. Using a non-parametric paired Conover Test, it was found that full hand was the most confident form of exploration (vs. single finger p=0.04, and vs. two fingers p=002), while participants were not significantly more confident on their thresholds with one finger or two fingers.

Visual Control Experiment

A control experiment combined with Experiment 2 was run in order to ensure that participants were not able to establish the curvature or shape of the presented shapes in Experiment 1 and 2 based on the visual shape rendered in virtual reality.

In this control experiment, participants were not allowed to touch the surface, and were requested to perform the assessment only through visual cues. The VR setup and rendering of the shape display was designed through several iterations and pilots to visually obfuscate as much as possible the curvature of the shape. Therefore, the assessment during the task would need to be based on tactile input rather than visual. This control condition would account for this assumption and validate that in the previous experiments the assessments were based only on the haptic experience of touching the haptic rendering device.

Given the non-parametric nature of the paired test, a paired Friedman analysis was performed. A significant difference across conditions ($\chi 2$=12.9, df=3, p=0.004) was found. Results showed that visual assessment was not sufficient to complete the curvature task (Experiment 2). Using visual cues only, the threshold reached only an average of 15±5sd (standard deviation) mm of curvature, far from the results achieved when participants were allowed to explore the curvatures with the full hand (9±2sd mm), single finger (8.5±1sd mm) and two fingers (9.5±3sd mm) (Paired-Conover test with Bonferroni adjustment p<0.002). Participants reached in average 1.5 counts the mean threshold.

Unlike other shape-changing devices, the examples described herein displayed smooth representations of and transitions between shapes, rather than high frequency displacements or abrupt changes in curvature. Further, surface orientation influences curvature perception. The disclosed examples present curvature correctly locally as the patterned layer smoothly interpolates between actuated positions. The experiments described above may indicate that bi-directional curvature of a haptic rendering device is detectable for even small amounts of curvature. These results also indicate that the eyes and hands may be better at determining small shape changes than the eyes alone, indicating potential for use in a variety of simulation applications that utilize tactile feedback.

In some embodiments, the methods and processes described herein may be tied to a computing system of one or more computing devices. In particular, such methods and processes may be implemented as a computer-application program or service, an application-programming interface (API), a library, and/or other computer-program product.

Figure 14:
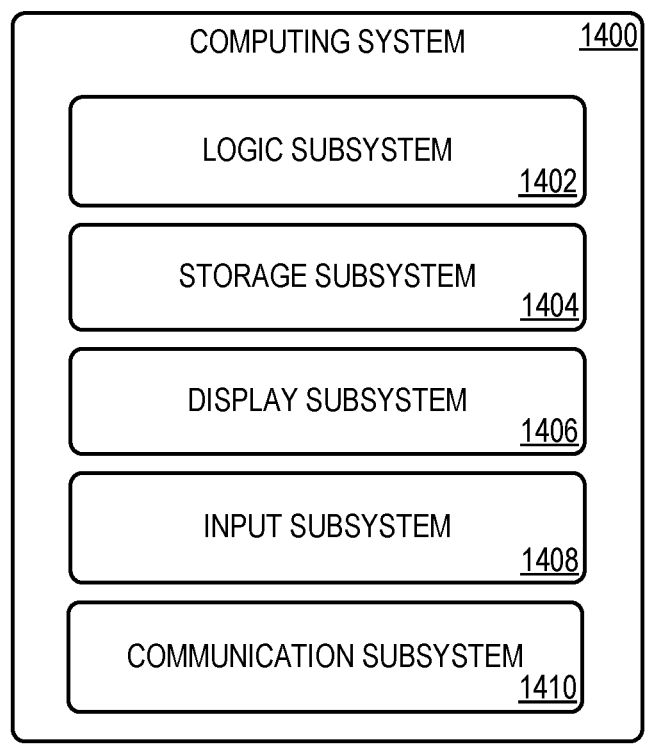
FIG. 14 is a block diagram illustrating an example computing system.

FIG. 14 schematically shows a non-limiting embodiment of a computing system 1400 that can enact one or more of the methods and processes described above. Computing system 1400 is shown in simplified form. Computing system 1400 may take the form of one or more personal computers, server computers, tablet computers, home-entertainment computers, network computing devices, gaming devices, mobile computing devices, mobile communication devices (e.g., smart phone), and/or other computing devices.

Computing system 1400 includes a logic machine 1402 and a storage machine 1404. Computing system 1400 may optionally include a display subsystem 1406, input subsystem 1408, communication subsystem 1410, and/or other components not shown in FIG. 14.

Logic machine 1402 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 1402 may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1404 includes one or more physical devices configured to hold instructions executable by the logic machine to implement the methods and processes described herein. When such methods and processes are implemented, the state of storage machine 1404 may be transformed—e.g., to hold different data.

Storage machine 1404 may include removable and/or built-in devices. Storage machine 1404 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1404 may include volatile, nonvolatile, dynamic, static, read/write, read-only, random-access, sequential-access, location-addressable, file-addressable, and/or content-addressable devices.

It will be appreciated that storage machine 1404 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1402 and storage machine 1404 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "program" and "engine" may be used to describe an aspect of computing system 1400 implemented to perform a particular function. In some cases, a program or engine may be instantiated via logic machine 1402 executing instructions held by storage machine 1404. It will be understood that different programs and/or engines may be instantiated from the same application, service, code block, object, library, routine, API, function, etc. Likewise, the same program and/or engine may be instantiated by different applications, services, code blocks, objects, routines, APIs, functions, etc. The terms "program" and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1406 may be used to present a visual representation of data held by storage machine 1404. This visual representation may take the form of a graphical user interface (GUI). As the herein described methods and processes change the data held by the storage machine, and thus transform the state of the storage machine, the state of display subsystem 1406 may likewise be transformed to visually represent changes in the underlying data. Display subsystem 1406 may include one or more display devices utilizing virtually any type of technology. Such display devices may be combined with logic machine 1402 and/or storage machine 1404 in a shared enclosure, or such display devices may be peripheral display devices.

When included, input subsystem 1408 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1410 may be configured to communicatively couple computing system 1400 with one or more other computing devices. Communication subsystem 1410 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1400 to send and/or receive messages to and/or from other devices via a network such as the Internet.

Another example provides a haptic rendering device comprising a patterned layer that exhibits auxetic behavior and a plurality of actuators configured to move the patterned layer, each actuator being individually controllable to cooperatively change a curvature of the patterned layer in two dimensions. In such an example, the patterned layer may additionally or alternatively comprise an Archimedean spiral pattern. In such an example, the patterned layer may additionally or alternatively comprise a metallic material, a polymer material, or a composite material. In such an example, the patterned layer may additionally or alternatively comprise 40 to 60% void space by volume. In such an example, the haptic rendering device may additionally or alternatively comprise an elastomeric material that fills the void space. In such an example, the plurality of actuators may additionally or alternatively comprise a central actuator configured to move the patterned layer at a center of the patterned layer, and may additionally or alternatively comprise one or more actuators configured to move the patterned layer at a perimeter of the patterned layer. In such an example, the plurality of actuators may additionally or alternatively comprise a plurality of linear actuators. In such an example, one or more actuators each may additionally or alternatively be attached at a first end to the patterned layer via a ball and socket joint. In such an example, the haptic rendering device may additionally or alternatively comprise a tactile layer attached to the patterned layer at a surface with which a user interacts with the haptic rendering device.

Another example provides a haptic feedback system comprising a haptic rendering device comprising a patterned layer that exhibits auxetic behavior, a plurality of actuators configured to move the patterned layer, each actuator being individually controllable, and a tactile layer attached to the patterned layer, and a controller configured to selectively control the actuators to move the patterned layer and impart a curvature to the patterned layer. In such an example, the controller may additionally or alternatively be configured to receive a control instruction from a remote computing device and to control the actuators based on the control instruction. In such an example, the control instruction may additionally or alternatively comprise information regarding a shape of an object to be rendered by the haptic rendering device. In such an example, the patterned layer may additionally or alternatively be formed from a non-auxetic material. In such an example, the non-auxetic material may additionally or alternatively comprise a metallic material, a polymer material, or a composite material. In such an example, the patterned layer may additionally or alternatively comprise 40-60% void space, and the tactile layer may additionally or alternatively comprise an elastomeric material that fills the void space. In such an example, the tactile layer may additionally or alternatively comprise a fabric material attached to the patterned layer at a surface with which a user interacts with the haptic rendering device.

Another example provides a method of operating a haptic rendering device comprising a patterned layer that exhibits auxetic behavior and also comprising a plurality of actuators individually controllable to cooperatively change a curvature of the patterned layer, the method comprising receiving information regarding a shape to be rendered by the haptic rendering device, and based on the information received, controlling one or more actuators of the haptic rendering device to move the patterned layer and thereby change the curvature of the patterned layer in two dimensions. In such an example, receiving the information may additionally or alternatively comprise receiving, from a head-mounted display device, information regarding a shape of a displayed virtual object. In such an example, receiving the information may additionally or alternatively comprise receiving, from a head-mounted display device, information regarding a pose of a hand relative to a displayed virtual object. In such an example, controlling the one or more actuators may additionally or alternatively comprise, for each of one or more linear actuators, changing an extension length of the linear actuator.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A haptic rendering device, comprising:

a patterned layer that exhibits auxetic behavior, the patterned layer comprising a pattern formed by one or more of cuts and formed indentations in a non-auxetic material; and a plurality of actuators configured to move the patterned layer, each actuator being individually controllable to cooperatively change a curvature of the patterned layer in two dimensions.

2. The haptic rendering device of claim 1, wherein the patterned layer comprises an Archimedean spiral pattern.

3. The haptic rendering device of claim 1, wherein the patterned layer comprises a metallic material, a polymer material, or a composite material.

4. The haptic rendering device of claim 1, wherein the patterned layer comprises 40 to 60% void space by volume.

5. The haptic rendering device of claim 3, further comprising an elastomeric material that fills the void space.

6. The haptic rendering device of claim 1, wherein the plurality of actuators comprises a central actuator configured to move the patterned layer at a center of the patterned layer, and also comprises one or more actuators configured to move the patterned layer at a perimeter of the patterned layer.

7. The haptic rendering device of claim 1, wherein the plurality of actuators comprises a plurality of linear actuators.

8. The haptic rendering device of claim 1, wherein one or more actuators are each attached at a first end to the patterned layer via a ball and socket joint.

9. The haptic rendering device of claim 1, further comprising a tactile layer attached to the patterned layer at a surface with which a user interacts with the haptic rendering device.

10. A haptic feedback system, comprising:
a haptic rendering device comprising
- a patterned layer that exhibits auxetic behavior, the patterned layer comprising a pattern formed by one or more of cuts and formed indentations in a non-auxetic material,
- a plurality of actuators configured to move the patterned layer, each actuator being individually controllable, and
- a tactile layer attached to the patterned layer; and a controller configured to selectively control the actuators to move the patterned layer and impart a curvature to the patterned layer.

11. The haptic feedback system of claim 10, wherein the controller is further configured to receive a control instruction from a remote computing device and to control the actuators based on the control instruction.

12. The haptic feedback system of claim 10, wherein the control instruction comprises information regarding a shape of an object to be rendered by the haptic rendering device.

13. The haptic feedback system of claim 10, wherein the non-auxetic material comprises a metallic material, a polymer material, or a composite material.

14. The haptic feedback system of claim 10, wherein the patterned layer comprises 40-60% void space, and wherein the tactile layer comprises an elastomeric material that fills the void space.

15. The haptic feedback system of claim 10, wherein the tactile layer comprises a fabric material attached to the patterned layer at a surface with which a user interacts with the haptic rendering device.

16. A method of operating a haptic rendering device comprising a patterned layer that exhibits auxetic behavior and also comprising a plurality of actuators individually controllable to cooperatively change a curvature of the patterned layer, the method comprising:
- receiving information regarding a shape to be rendered by the haptic rendering device; and
- based on the information received, controlling one or more actuators of the haptic rendering device to move the patterned layer and thereby change the curvature of the patterned layer in two dimensions, the patterned layer comprising a pattern formed by one or more of cuts and formed indentations in a non-auxetic material.

17. The method of claim 16, wherein receiving the information comprises receiving, from a head-mounted display device, information regarding a shape of a displayed virtual object.

18. The method of claim 16, wherein receiving the information comprises receiving, from a head-mounted display device, information regarding a pose of a hand relative to a displayed virtual object.

19. The method of claim 16, wherein controlling the one or more actuators comprises, for each of one or more linear actuators, changing an extension length of the linear actuator.

* * * * *